Oct. 3, 1961        H. H. HOMER        3,002,933
METHOD OF HALOPHOSPHATE PHOSPHOR MANUFACTURE
Filed Dec. 10, 1958
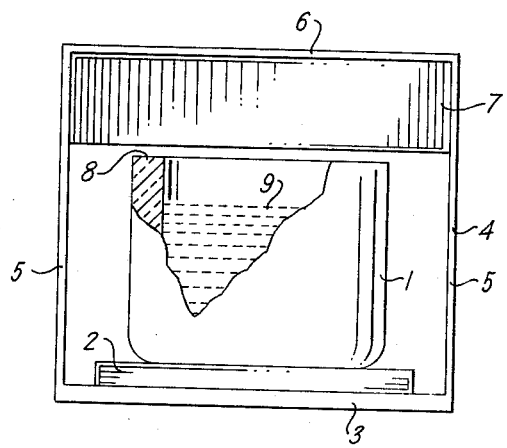
INVENTOR
HORACE H. HOMER
BY
ATTORNEY 3,002,933
METHOD OF HALOPHOSPHATE PHOSPHOR MANUFACTURE Horace H. Homer, Arlington, Mass., assignor, by mesne assignments, to Sylvania Electric Products Inc., Wilmington, Del., a corporation of Delaware
Filed Dec. 10, 1958, Ser. No. 779,399
4 Claims. (Cl. 252—301.4)

This invention relates especially to halophosphate phosphors, and particularly to calcium halophosphate phosphors activated with antimony and manganese, and in which at least part of the halogen content is chlorine, although the invention can also be applied to the manufacture of other similarly activated phosphors.

In an application of Horace H. Homer and Keith H. Butler, for a Method of Making Halophosphate Phosphors, Serial No. 779,370 filed December 10, 1958, a process is described in which such a phosphor is made from powdered material fired in a furnace through which the material is moved in boats, either continuously or in steps, the furnace being divided into successive zones of different temperatures and controlled atmospheres.

When the firing is done in ordinary air, the material in the boat turns pink throughout, and is ineffective as a phosphor. The pink color is due to oxidation of the manganese, and so to reduce the amount of oxidation, the material can be fired in a covered crucible, but in that case the pressure of the antimony chloride rises above atmospheric, and produces a very hard cake of phosphor. A more effective method is shown in the previously-mentioned application, that is, firing in open boats in an atmosphere of inert gas, which can be made to flow through the furnace.

In the latter case, the maximum efficiency of production might be expected to occur when the boats were filled to the brim. I have discovered, however, that when the boats are so filled the top layer of the fired material is pink, and has to be discarded, only the white material below the pink layer being useful as a phosphor.

I have further discovered that the pink top layer in the latter case is due to the action of the inert gas flow in sweeping away the antimony chloride formed by the reaction of the materials in the powdered mixture. The manganese, oxidized to at least a moderate state of oxidation by the water vapor, carbon dioxide and other oxidizing gases driven from the raw materials while they are at low temperature, will be reduced to a lower state of oxidation by the antimony chloride produced by the reaction of the materials at a higher temperature. But at the top of the boat, the flow of inert gas carries away the antimony chloride and reduces its concentration. The manganese at the surface of the filling will not be as effectively reduced as that below it, and will remain in a higher valence state, discloring the material. Any small amount of air present in the inert gas atmosphere will add still further to the discoloration.

Thus, if the furnace is operated with the boats completely filled, there will be a pink layer on the top of the material in each boat after firing, and this layer, being of poor fluorescence, will have to be removed and discarded, leaving as phosphor only the reacted white material under the layer.

I have now discovered that this loss in material can be reduced or eliminated by extending the sides of the boat above the top of the charge, for example by placing a cuff on top of the walls of the boat, or by filling the boat only partly, thereby leaving an unfilled space at the top of the boat. I have discovered that under such conditions, the top remains white and fluorescent, so that the entire fired charge is useful as phosphor.

The reason for this appears to be that the walls above the charge provide a "dead gas" space over the charge in the boat, and carry it along with the boat as the crucible is moved through the oven, so that when the mixture reacts, giving off antimony chloride, an atmosphere containing that chloride remains over the mixture and allows the reaction to proceed at the proper rate at the top of the charge. In that way there is produced a thoroughly-reacted phosphor without the so-called "pink top," or with a great reduction in the amount of "pink top."

Other objects, advantages and features of the invention will be apparent from the following specification, taken with its accompanying drawing.

In the figure, the silica boat 1 rests on a ceramic plate 2 on the bottom 3 of furnace 4. The latter has side-walls 5 and a top 6, from which the baffle 7 extends down to nearly the top 8 of boat 1, the distance between them being preferably just enough to provide proper clearance.

The boat 1 was 6 inches wide, 8 inches long and 4½ inches high, and filled to a distance of 1½ inches from its top with a starting mixture of raw materials mixed intimately as fine powders, the materials being listed below, together with the proper proportions:

| Material: | Weight in grams |
|---|---|
| $CaHPO_4$ (3% $H_2O$ by weight) | 631.0 |
| $CaCO_3$ | 195.9 |
| $CaF_2$ (3% $H_2O$ by weight) | 47.4 |
| $NH_4Cl$ | 21.8 |
| $MnCO_3$ | 22.4 |
| $Sb_2O_3$ | 26.4 |
| Total | 944.5 |

A quantity of this mixture, or "charge" was placed in a silica boat of the dimensions previously given, so as to leave a distance of about 1½ inches between the top of the charge and the top of the boat. This leaves a "dead gas" space directly over the mixture, and which is carried along with it, so that when the mixture reacts, giving off antimony chloride, an atmosphere containing that chloride remains over the mixture and allows the reaction to proceed at the proper rate to produce a phosphor thoroughly reacted throughout its volume, but without the so-called "pink top" which forms if the boat is filled, and which has to be removed as useless. Only the non-pink material underneath is useful as phosphor.

The open boat 1, uncovered, is then heated in the furnace 4, while an insert gas such as nitrogen or argon, for example, is flowed over the boat. By "inert gas" we here mean a gas inert with respect to the charge at the temperatures used. The phosphor can be preheated at about 1150° F. for about 12 minutes, then heated at 1350° F. for about another 12 minutes, and finally at 2050° F. for about 40 minutes, after which it is cooled, all the above being done while an inert gas flows through the furnace as in the copending patent application mentioned above and filed of even date herewith by Keith H. Butler and Horace H. Homer. The times and temperatures given above are merely given by way of example, and can be varied considerably, as explained in said copening application.

The resultant phosphor will be soft and easily broken up into its constituent particles as a powder.

As previously explained, if the charge in boat 1 is exposed to the air during firing the resultant material is ineffective as a phosphor. If a loosely-fitting cover is placed on the boat and the boat fired in air, the resultant phosphor will fluoresce, but will be in the form of a hard cake, difficult to grind into a powder for application to a lamp, and of reduced brightness. This is because an atmosphere of antimony chloride will build up in the boat to a pressure above atmospheric in order to leave the boat around the edges of the loose-fitting cover. The higher concentration of antimony chloride at the high pressure produces a hard cake of phosphor.

When the boat 6 is filled to the top, the phosphor will also have a pink top crust, because the flow of inert gas will sweep the antimony chloride away as fast as it is produced, keeping its partial pressure substantially zero. However, when a hollow cuff is placed on the boat 6 to extend the sides of the boat 6 upward above the charge, or when the boat 6 is filled to a level below the top of the boat 6, as taught herein, the partial pressure of the antimony chloride is susbtantially below atmospheric yet substantially above zero.

Under such conditions, the pink top will be missing and a very effective phosphor produced, soft and readily broken up into a powder without much grinding.

Although specific proportions of materials were given in the specific example, they are not critical and can be varied considerably in accordance with the knowledge of the art. Other starting materials can be used, as is also known in the art.

What I claim is:

1. In the manufacture in a furnace of powered halophosphate phosphors, antimony and manganese activated, from a mixture of powdered raw materials containing compounds of antimony, of manganese, and of chlorine, the steps of placing a charge of such raw materials in an uncovered boat to a level sufficiently below that of the top of the boat to allow room for the accumulation of an atmosphere of antimony chloride above the phosphor, flowing a substantially inert gas into the furnace and firing the materials at high temperature, while said unconvered boat is open to the gases of said furnace.

2. In the manufacture in a furnace of powdered halophosphate phosphors from a mixture of raw materials containing antimony chloride, the steps of placing a charge of such raw materials in an uncovered boat to a level sufficiently below that of the top of the boat to allow accumulation of an atmosphere of antimony chloride above the phosphor in the presence of a flow of substantially inert gas across the top of the said boat, flowing a substantially inert gas across the top of the boat, and firing at the same time at high temperaure, while said uncovered boat is open to the gases of said furnace.

3. In the manufacture in a furnace of powdered, antimony-activated halophosphate phosphors from a mixture of powered raw materials containing compounds of antimony and of chlorine, the steps of placing a charge of said raw materials in an uncovered boat, firing said charge of raw materials at high temperatures in said uncovered boat while exposed to the gases of said furnace, maintaining the level of said charge of raw materials sufficiently below the top of said boat to allow room for accumulation of an atmosphere of antimony chloride above said phosphor and flowing a substantially inert gas across the top of said boat during firing.

4. The process according to claim 3 wherein the charge of raw materials is maintained at a level between about two thirds and three fourths of the inside height of said boat.

References Cited in the file of this patent

UNITED STATES PATENTS 2,672,451    Wollentin  --------------  Mar. 16, 1954
2,755,254    Butler  -----------------  July 17, 1956